US012559584B2

(12) United States Patent
DeRocher et al.

(10) Patent No.: US 12,559,584 B2
(45) Date of Patent: Feb. 24, 2026

(54) AQUEOUS DISPERSION OPACIFYING PIGMENT-BINDER HYBRID POLYMER PARTICLES

(71) Applicant: Rohm and Haas Company, Collegeville, PA (US)

(72) Inventors: Jonathan DeRocher, Coopersburg, PA (US); Antony K. Van Dyk, Blue Bell, PA (US); Qing Zhang, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 449 days.

(21) Appl. No.: 18/022,536

(22) PCT Filed: Aug. 19, 2021

(86) PCT No.: PCT/US2021/046610
§ 371 (c)(1),
(2) Date: Feb. 22, 2023

(87) PCT Pub. No.: WO2022/055682
PCT Pub. Date: Mar. 17, 2022

(65) Prior Publication Data

US 2023/0322999 A1 Oct. 12, 2023

Related U.S. Application Data

(60) Provisional application No. 63/077,823, filed on Sep. 14, 2020.

(51) Int. Cl.
*C08K 3/22* (2006.01)
*C08F 285/00* (2006.01)
*C08L 71/02* (2006.01)

(52) U.S. Cl.
CPC .............. *C08F 285/00* (2013.01); *C08K 3/22* (2013.01); *C08L 71/02* (2013.01); *C08K 2003/2241* (2013.01)

(58) Field of Classification Search
CPC ...... C08F 285/00; C08F 220/585; C08K 3/22; C08K 2003/2241; C08L 71/02; C09D 151/003
USPC .......................................................... 523/201
See application file for complete search history.

(56) References Cited

U.S. PATENT DOCUMENTS

| | | | | |
|---|---|---|---|---|
| 6,020,435 | A | 2/2000 | Blankenship et al. | |
| 7,629,414 | B2 | 12/2009 | Bardman et al. | |
| 7,691,942 | B2 | 4/2010 | Bardman et al. | |
| 8,445,559 | B2 | 5/2013 | Bardman | |
| 8,865,827 | B2 * | 10/2014 | Henderson | C08F 220/382 524/547 |
| 8,907,004 | B2 | 12/2014 | Henderson et al. | |
| 9,346,972 | B2 | 5/2016 | Bohling et al. | |
| 9,587,135 | B2 | 3/2017 | Van Dyk et al. | |
| 9,963,615 | B2 | 5/2018 | DeRocher et al. | |
| 10,494,530 | B2 | 12/2019 | DeRocher et al. | |
| 2014/0039115 | A1 | 2/2014 | DeRocher et al. | |
| 2015/0175832 | A1 | 6/2015 | Bohling et al. | |
| 2016/0090502 | A1 | 3/2016 | Van Dyk et al. | |
| 2023/0167309 | A1 * | 6/2023 | Zhang | C09D 7/45 523/201 |
| 2024/0425678 | A1 * | 12/2024 | Nungesser | C09D 17/008 |

* cited by examiner

*Primary Examiner* — Hannah J Pak

(57) ABSTRACT

The present invention relates to a composition comprising an aqueous dispersion of opacifying pigment-binder hybrid polymer particles and a dispersant functionalized with a sulfur acid monomer absorbed to opacifying pigment particles. The composition of the present invention is useful for improving wet-hide performance in paints.

7 Claims, No Drawings

AQUEOUS DISPERSION OPACIFYING PIGMENT-BINDER HYBRID POLYMER PARTICLES

BACKGROUND OF THE INVENTION

The present invention relates to an aqueous dispersion of opacifying Pigment-binder hybrid polymer particles, more particularly an aqueous dispersion that further includes a dispersant functionalized with a sulfur acid monomer absorbed to opacifying pigment particles.

Titanium oxide ($TiO_2$) is the mostly commonly used opacifying pigment in the paint industry due to its very high refractive index. Nevertheless, $TiO_2$, is the most expensive component in paint; moreover, its manufacture requires high energy consumption and poses potential environmental hazardous risks. As regulatory agencies around the world are promoting legislation designed to place warning labels on products containing $TiO_2$, an additional urgency for greatly reducing the concentration of $TiO_2$ in consumer products such as architectural paints has arisen.

Opacifying performance in paints can be enhanced by the addition of dispersed opaque polymer polymers, which are effective as a supplement to reduce the loading of $TiO_2$ in coatings compositions. (See U.S. Pat. No. 6,020,435.) More recently, dispersed opaque polymers coated with film-forming binder particles, (opacifying pigment-binder hybrid polymer particles) for example opaque acrylic polymers (OAPs) as disclosed in U.S. Pat. No. 7,629,414 B2, have been reported to provide superior opacity characteristics when incorporated into the coatings.

One of the yet unsolved technical challenges observed with opacifying pigment-binder hybrid particles is acceptable wet-hide, that is, the hiding observed on a painted substrate before substantial drying of the coating. This unacceptable wet hide is due to the small refractive index difference between the water-filled core and the shell of the hybrid particles in the wet state. Inasmuch as poor wet-hide is a major obstacle for using opacifying pigment-binder hybrid particles, it would be an advantage in the art of architectural coatings formulations to find a way to improve wet-hide in formulations containing opacifying pigment-binder hybrid particles.

SUMMARY OF THE INVENTION

The present invention addresses a need in the art by providing a composition comprising an aqueous dispersion of:

a) multistage polymer particles comprising 1) a water-occluded core comprising from 20 to 60 weight percent structural units of a salt of a carboxylic acid monomer and from 40 to 80 weight percent structural units of a nonionic monoethylenically unsaturated monomer; 2) a polymeric shell having a $T_g$ in the range of from 60° C. and 120° C.; and 3) a polymeric binder layer superposing the shell, which polymeric binder layer has a $T_g$ of not greater than 35° C. and comprises structural units of at least one monoethylenically unsaturated monomer;

b) opacifying inorganic pigment particles; and c) a water-soluble dispersant absorbed onto the surfaces of the inorganic opacifying pigment particles;

wherein the weight-to-weight ratio of the polymer binder to the sum of the shell and the structural units of monomers in the core in the multistage polymer particles is in the range of 1:1 to 3.5:1; and the z-average particle size of the multistage polymer particles is in the range of from 300 nm to 750 nm;

wherein the water-soluble dispersant comprises structural units of a sulfonic acid monomer or a salt thereof and less than 30 weight percent structural units of acrylic acid or methacrylic acid, based on the weight of the dispersant; and wherein the concentration of the dispersant is in the range of from 0.1 to 5 weight percent, based on the weight of the dispersant and the inorganic pigment particles.

The composition of the present invention is useful for improving wet-hide in architectural coatings formulations.

DETAILED DESCRIPTION OF THE INVENTION

The present invention is a composition comprising an aqueous dispersion of:

a) multistage polymer particles comprising 1) a water-occluded core comprising from 20 to 60 weight percent structural units of a salt of a carboxylic acid monomer and from 40 to 80 weight percent structural units of a nonionic monoethylenically unsaturated monomer; 2) a polymeric shell having a $T_g$ in the range of from 60° C. and 120° C.; and 3) a polymeric binder layer superposing the shell, which polymeric binder layer has a $T_g$ of not greater than 35° C. and comprises structural units of at least one monoethylenically unsaturated monomer;

b) opacifying inorganic pigment particles; and c) a water-soluble dispersant absorbed onto the surfaces of the inorganic opacifying pigment particles;

wherein the weight-to-weight ratio of the polymer binder to the sum of the shell and the structural units of monomers in the core in the multistage polymer particles is in the range of 1:1 to 3.5:1; and the z-average particle size of the multistage polymer particles is in the range of from 300 nm to 750 nm;

wherein the water-soluble dispersant comprises structural units of a sulfonic acid monomer or a salt thereof and less than 30 weight percent structural units of acrylic acid or methacrylic acid, based on the weight of the dispersant; and wherein the concentration of the dispersant is in the range of from 0.1 to 5 weight percent, based on the weight of the dispersant and the inorganic pigment particles.

The water-occluded core comprises from 20, preferably from 25, more preferably from 30, and most preferably from 32 weight percent, to 60, preferably to 50, more preferably to 40, and most preferably 36 weight percent structural units of a salt of a carboxylic acid monomer based on the weight of structural units of monomers in the core.

As used herein, the term "structural units" refers to the remnant of the recited monomer after polymerization. For example, a structural unit of a salt of methacrylic acid, where $M^+$ is a counterion, preferably a lithium, sodium, or potassium counterion, is as illustrated:

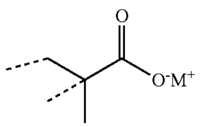

Examples of suitable carboxylic acid monomers include acrylic acid, methacrylic acid, itaconic acid, and maleic acid.

The water-occluded core further comprises from 40, preferably from 50, more preferably from 55, more preferably from 60, and most preferably from 64 weight percent to 80, preferably to 75, more preferably to 70, and most preferably to 68 weight percent structural units of a nonionic monoethylenically unsaturated monomer based on the weight of structural units of monomers in the core. Examples of nonionic monoethylenically unsaturated monomers include one or more acrylates and/or methacrylates such as methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and one or more monoethylenically unsaturated aromatic compounds such as styrene, α-methylstyrene, and 4-t-butylstyrene. A preferred nonionic monoethylenically unsaturated monomer is methyl methacrylate.

The polymeric shell of the multistage polymer particles preferably has a $T_g$ in the range of not less than 80° C., more preferably not less than 90° C., and most preferably not less than 95° C., and preferably not greater than 115° C., and most preferably not greater than 110° C. As used herein, $T_g$ refers to the glass transition temperature as calculated by the Fox equation.

Preferably, the shell of the multistage polymer particles comprises structural units of methyl methacrylate, styrene, α-methylstyrene, isobornyl methacrylate, lauryl methacrylate, or cyclohexyl methacrylate. In one embodiment, the shell comprises at least 80, more preferably at least 90, and most preferably at least 95 weight percent structural units of styrene. In another embodiment, the shell comprises from 89 to 93 weight percent structural units of styrene and from 7 to 11 weight percent structural units of any or all of methyl methacrylate (4 to 5 weight percent), cyclohexyl methacrylate (0.9 to 2 weight percent), methacrylic acid (2 to 3 weight percent), and allyl methacrylate (ALMA, 0.1 to 0.5 weight percent).

The shell of the multistage polymer particles may also further comprise structural units of other multiethylenically unsaturated monomers such as divinyl benzene (DVB), trimethylolpropane trimethacrylate (TMPTMA), or trimethylolpropane triacrylate (TMPTA).

As used herein, "polymeric binder" refers to a polymeric material that is film forming on a desired substrate, with or without a coalescent. In one aspect, the $T_g$ of the polymeric binder as calculated by the Fox equation is not greater than 25° C.; in another aspect, not greater than 15° C., in another aspect, not greater than 10° C., and in another aspect not less than −20° C., and in another aspect not less than −10° C.

Examples of suitable polymeric binder materials include acrylic, styrene-acrylic, vinyl esters such as vinyl acetate and vinyl versatates, and vinyl ester-ethylene polymeric binders. Acrylic binders comprising structural units of methyl methacrylate and structural units of one or more acrylates such as methyl acrylate, ethyl acrylate, n-butyl acrylate, or 2-ethylhexyl acrylate, are especially preferred, as are styrene-acrylic binders.

Preferably, the weight-to-weight ratio of structural units of monomers of the core to the shell in the multistage polymer particles is in the range of 1:12 to 1:16. Preferably, the weight-to-weight ratio of the polymer binder to the sum of the structural units of monomers of the core and the shell in the multistage polymer particles is in the range of from 1.2:1, more preferably from 1.5:1, and most preferably from 1.8:1, to preferably 3.0:1, more preferably to 2.5:1, and most preferably to 2.2:1.

The z-average particle size of the multistage polymer particles is in the range of from 400 nm, more preferably from 450 nm, most preferably from 475 nm, to preferably 700 nm, more preferably 600 nm, and most preferably to 550 nm. As used herein, z-average particle size refers to particle size as determined by dynamic light scattering, for example by a BI-90 Plus Particle Size Analyzer (Brookhaven).

The aqueous dispersion of multistage polymer particles can be prepared as described in U.S. Pat. No. 7,691,942 B2. An example of a preferred method of preparing the dispersion of second multistage polymer particles is shown in Intermediate Example 1 of the Example section.

The water-soluble dispersant preferably comprises at least 30%, more preferably at least 50%, to 100% more preferably to 80% by weight structural units of a sulfonic acid monomer or a salt thereof, based on the weight of the dispersant. Examples of suitable sulfonic acid monomers include 2-acrylamido-2-methylpropane sulfonic acid and salts thereof, vinyl sulfonic acid and salts thereof, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid and salts thereof.

The water-soluble dispersant preferably comprises structural units of another co-monomer, examples of which include acrylates and methacrylates such as methyl methacrylate, ethyl acrylate, butyl acrylate, and 2-ethylhexyl acrylate; dialkylaminoalkyl acrylates and methacrylates including 2-(N,N-dimethylamino)ethyl methacrylate (DMAEMA), 2-(N,N-dimethylamino)ethyl acrylate, 2-(N,N-diethylamino)ethyl methacrylate, 2-(N,N-diethylamino)ethyl acrylate 2-(t-butylamino)ethyl methacrylate, 3-(dimethylamino)propyl acrylate, 2-diisopropylaminoethyl methacrylate, and 3-dimethylaminoneopentyl acrylate; polyalkylene glycol acrylates and methacrylates including poly(ethylene glycol) methacrylate, poly(ethylene glycol) acrylate, and lauryl-O—$(CH_2CH_2O)_{23}$-methacrylate; dialkylaminoalkyl acrylamides and methacrylamides including N-[2(N,N-dimethylaminoethyl]methacrylamide, N-[3-(N,N-dimethylamino)propyl]acrylamide, and N-[3-(N,N-dimethylamino)propyl]methacrylamide; acrylamidotrialkylammonium halides including [2-(acryloxy)ethyl]trimethylammonium chloride, [2-(methacryloxy)ethyl]trimethylammonium chloride, and (3-methacrylamidopropyl)trimethylammonium chloride.

Other suitable co-monomers include alkylamino(polyalkylene oxide) acrylates and methacrylates, more particularly mono- and dialkylamino(polyethylene oxide) acrylates and methacrylates, such as $CH_2{=}CCH_3{-}(OCH_2CH_2)_{1\text{-}30}NR^1R^2$ where $R^1$ is H or —$C_1$-$C_{12}$-alkyl, $R^2$ is $C_3$-$C_{12}$ alkyl; alkylammonium(polyethylene oxide) acrylates and methacrylates, more particularly mono-, di-, and trialkylammonium(polyethylene oxide) acrylates and methacrylates such as $CH_2{=}CCH_3{-}(OCH_2CH_2)N^+R^1R^2R^3$, where $R^1$ and $R^3$ are each independently hydrogen or $C_1$-$C_{12}$-alkyl; $R^2$ is $C_3$-$C_{12}$ alkyl; and $X^-$ is a counterion.

Still other examples of suitable co-monomers include vinyl pyridines; vinyl pyrrolidones, styrenes; hydroxyalkyl acrylates and methacrylates such as hydroxyethyl methacrylate (HEMA) and hydroxypropyl acrylate (HPA).

The water-soluble dispersant may also comprise structural units of a carboxylic acid monomer such as acrylic acid (AA), methacrylic acid (MAA), and itaconic acid (IA), generally at a concentration in the range of from 0.5 to 5 weight percent, based on the weight of the dispersant.

The dispersant preferably has a weight average molecular weight ($M_w$), as measured by gel permeation chromatography using polyacrylic acid standards of from 1000 g/mol, more preferably from 2000 g/mol, to 25,000, more preferably to 15,000, and most preferably to 8,000 g/mol. Particularly preferred inorganic opacifying pigment particles pigments particles are $TiO_2$ particles.

In a preferred method of preparing the composition of the present invention, opacifying pigment, preferably $TiO_2$ powder, is combined with an aqueous solution of the dispersant. The concentration of the dispersant is in the range of from 0.1, preferably from 0.2, and more preferably from 0.5 weight percent, to 5, preferably to 3 and more preferably to 2 weight percent, based on the weight of the dispersant and the inorganic pigment particles. The mixture is then contacted with the aqueous dispersion of the multistage polymer particles to form the composition of the present invention. The composition may further include other materials such as coalescents, rheology modifiers, surfactants, defoamers, and extenders.

PVC Calculation

Pigment volume concentrations are calculated by the following formula:

$$PVC = \left[\frac{Vol\ \text{Pigment} + \text{Extender} + OP}{Vol\ \text{Pigment} + \text{Extender} + OP + \text{Binder Solids}}\right] \times 100$$

where binder solids refers to the contribution of polymer from the polymer binder layer of the Intermediate Example 1 or to binder from RHOPLEX™ SG-10 AF Polymer. OP refers to the core:shell portion of the multistage polymer particles.

EXAMPLES

Intermediate Example 1—Preparation of an Aqueous Dispersion of Binder Coated Multistage Polymer Particles In the following Example, Core #1 refers to an aqueous dispersion of polymer particles (66 MMA/34 MAA, solids 31.9%, z-average particle size of 135 nm) prepared substantially as described in U.S. Pat. No. 6,020,435.

A 5-liter, four necked round bottom flask was equipped a paddle stirrer, thermometer, $N_2$ inlet and reflux condenser. DI water (475 g) was added to the kettle and heated to 89° C. under $N_2$. Sodium persulfate (NaPS, 3 g in 25 g water) was added to vessel immediately followed by Core #1 (125 g). Monomer emulsion 1 (ME 1), which was prepared by mixing DI water (125.0 g), Disponil FES-32 emulsifier (10.0 g), styrene (424.2 g), methacrylic acid (7.0 g), linseed oil fatty acid (2.8 g), acrylonitrile (112.0 g), and divinyl benzene (14.0 g), was then added to the kettle over 60 min. The temperature of the reaction mixture was allowed to increase to 84° C. after 15 min and allowed to increase to 92° C. after 25 min. Upon completion of the ME 1 feed, the reaction was cooled to 60° C.

When the kettle temperature reached 80° C., an aqueous mixture of ferrous sulfate and EDTA (20 g, 0.1 wt. % $FeSO_4$, 1 wt. % EDTA) was added to the kettle. When the kettle temperature reached 60° C., co-feeds including a solution of t-butylhydroperoxide (t-BHP 1.9 g) and NaPS (5.0 g) mixed with DI water (100 g), along with a separate solution of isoascorbic acid (IAA, 2.6 g in 100 g water) were both added simultaneously to the kettle at a rate of 1.20 g/min. Two min after the charging of the co-feed solutions, ME 2, which was prepared by mixing DI water (240 g), Disponil FES-32 emulsifier (17.0 g), butyl acrylate (431.46 g), methyl methacrylate (430.54 g), 2-ethylhexyl acrylate (124.44 g), acetoacetoxyethyl methacrylate (25.5 g) and methacrylic acid (7.96 g), was added to the kettle over 60 min while allowing the temperature to rise to 86° C. without providing any external heat. Upon completion of ME 2 addition, the co-feed solutions were stopped and the batch was held for 5 min at 80-86° C. A solution of $NH_4OH$ (5 g, 28 wt. % aq.) mixed with DI water (5.0 g) was then added to the kettle along with hot (90° C.) DI water (175 g).

ME 3, which was prepared by mixing DI water (54.0 g), Disponil FES-32 emulsifier (3.0 g), butyl acrylate (104.4 g), methyl methacrylate (75.6 g), and 4-hydroxy TEMPO (3.0 g), was fed to the kettle over 5 min Immediately after the ME 3 feed addition was complete, $NH_4OH$ (35.0 g, 28 wt. % aq.) mixed with DI water (35 g) was added to the kettle over 2 min. When $NH_4OH$ addition was complete, the batch was held for 5 min. The addition the co-feed solutions was resumed at 1.2 g/min until completion, whereupon the dispersion was cooled to 25° C. While cooling, additional co-feeds including a solution of t-BHP (1.5 g) in DI water (25 g), along with a separate solution of IAA (0.7 g) in water (25 g) were both added simultaneously to the kettle at a rate of 1.30 g/min Upon completion of addition of the second co-feed, the dispersion was filtered to remove any coagulum. The filtered opaque acrylic dispersion (OAP) had a solids content of 48.7%. The S/mil was measured to be 1.03 with collapse of 0.0%.

Intermediate Example 2—Preparation of Dispersant

An aqueous solution of a copolymer of 63 AMPS/35 HPA/2 AA was combined with CARBOWAX™ MPEG 550 Methoxypolyethylene Glycol (MPEG 55, A Trademark of The Dow Chemical Company or its Affiliates, $M_n$=550 g/mol), to produce a solution containing 12% of the copolymer and 28% MPEG based on the weight of the solution.

Table 1 illustrates paint formulations with and without the key combination of the Intermediate 1 binder coated multistage polymer particles and the Intermediate 2 Dispersant. In the table, Comp. 1 and Comp. 2 refer to comparative examples 1 and 2, respectively, and Ex. 1 refers to example 1. Comp. Dispersant refers to a copolymer of 60 AA/40 HPA with an $M_n$=1500 g/mol; SG-10 AF refers to RHOPLEX™ SG-10 AF Polymer; RM-2020 refers to ACRYSOL™ RM-2020 Rheology Modifier; RM-825 refers to ACRYSOL™ RM-825 Rheology Modifier; 15-S-9 refers to TERGITOL™ 15-S-9 surfactant; and OAP PVC refers to the PVC component attributable to the core-shell (opaque polymer) portion of the Intermediate 1 binder coated multistage polymer particles. (RHOPLEX, ACRYSOL, and TERGITOL are all Trademarks of The Dow Chemical Company or its Affiliates.)

TABLE 1

Paint Formulations

| | Comp. 1 | Comp. 2 | Ex. 1 |
|---|---|---|---|
| Materials (g) | | | |
| Comp. Dispersant | 4.5 | 3.4 | |
| Intermediate 2 Dispersant | | | 4.2 |
| Water | 49.7 | 37.4 | 36.6 |
| Ti-Pure R-706 $TiO_2$ | 224.7 | 169.3 | 169.3 |
| Water | 29.9 | 22.6 | 22.6 |
| SG-10 AF | 667.7 | | |
| Intermediate 1 | | 627.3 | 627.3 |
| Texanol Coalescent | 25.6 | 15.5 | 15.5 |

TABLE 1-continued

| Paint Formulations | | | |
|---|---|---|---|
| | Comp. 1 | Comp. 2 | Ex. 1 |
| Water | 173.8 | 252.6 | 252.6 |
| RM-2020 | 26.9 | 27.1 | 27.1 |
| RM-825 | 0.7 | 0.7 | 0.7 |
| 15-S-9 | 2.4 | 2.4 | 2.4 |
| Property | | | |
| Total Volume (mL) | 1000.0 | 1000.0 | 1000.0 |
| Total Weight (g) | 1205.8 | 1158.2 | 1158.2 |
| Total PVC | 16.0 | 47.2 | 47.2 |
| $TiO_2$ PVC | 16.0 | 12.0 | 12.0 |
| OAP PVC | | 35.2 | 35.2 |
| Volume Solids (%) | 36.0 | 36.0 | 36.0 |
| Weight Solids (%) | 47.2 | 42.3 | 42.3 |

The wet hiding performance was characterized by the scattering efficiency (S/mil) as a function of drying time as follows. Two drawdowns were made for each paint on black release charts (Leneta Form RC-BC), one with a 1.5-mil bird film applicator and another with 25-mil film applicator. A paper mask was placed immediately against the film surface after the drawdown was completed to ensure that the wet paint did not contaminate the reflectometer. The masks were made from the Leneta 5C chart and the thickness was 1.5 mils for thin film measurements ($R_B$) and 25 mils for thick film (R) measurements. The reflectance of the freshly cast film was then measured as a function of time from 1 min to 2 h. Three measurements were done at each time and the average reflectance was recorded. The position of the reflectometer for each measurement was marked on the mask so that the same spot was measured at each time.

The reflectance of thick film R and thin film $R_B$ at a certain drying time were used to calculate the scattering efficiency S/mil at that time, using the following equation:

$$S = \frac{R}{X \times (1 - R^2)} \times \ln \frac{1 - (R_B \times R)}{1 - \frac{R_B}{R}}$$

Where X is the dry film thickness, R is the reflectance of the thick film and $R_B$ is the reflectance of the thin film. X can be calculated from the weight of the dry paint film ($W_{pf}$), the density (D) of the dry film; and the film area (A). Film area for a 3.25"×4" template was 13 $in^2$.

$$X(\text{mils}) = \frac{W_{pf}(g) \times 1000\left(\frac{\text{mil}}{\text{in}}\right)}{D\left(\frac{\text{lbs}}{\text{gal}}\right) \times 1.964\left(\frac{\frac{g}{\text{in}^3}}{\frac{\text{lbs}}{\text{gal}}}\right) \times A(\text{in})}$$

Table 2 shows hiding as a function of drying time.

TABLE 2

| Hiding as a Function of Drying Time | | | |
|---|---|---|---|
| Dry Time (min) | Comp. 1 | Comp. 2 | Ex. 1 |
| 1 | 9.92 | 6.25 | 7.84 |
| 2 | 9.78 | 5.96 | 7.44 |
| 5 | 9.54 | 5.62 | 7.31 |

TABLE 2-continued

| Hiding as a Function of Drying Time | | | |
|---|---|---|---|
| Dry Time (min) | Comp. 1 | Comp. 2 | Ex. 1 |
| 10 | 8.10 | 5.21 | 6.72 |
| 20 | 4.86 | 4.63 | 4.83 |
| 40 | 4.91 | 4.88 | 5.58 |
| 60 | 4.96 | 4.87 | 5.54 |
| 120 | 4.83 | 4.83 | 5.53 |

The data show that the paint containing the Intermediate 1 OAP and Intermediate 2 dispersant (Ex. 1) demonstrated a marked increase in wet-hide as compared with the paint containing Intermediate 1 and a dispersant based on acrylic acid and HPA (Comp. 2). The wet-hide observed for Ex. 1, while less than that observed for Comp. 1, is quite acceptable; moreover, the Ex. 1 formulation provides a substantial savings in $TiO_2$ loading.

The invention claimed is:

1. A composition comprising an aqueous dispersion of:

a) multistage polymer particles comprising 1) a water-occluded core comprising from 20 to 60 weight percent structural units of a salt of a carboxylic acid monomer and from 40 to 80 weight percent structural units of a nonionic monoethylenically unsaturated monomer; 2) a polymeric shell having a $T_g$ in the range of from 60° C. and 120° C., wherein the polymeric shell comprises at least 80 weight percent structural units of styrene; and 3) a polymeric binder layer superposing the shell, which polymeric binder layer has a $T_g$ of not greater than 35° C. and comprises structural units of at least one monoethylenically unsaturated monomer;

b) opacifying inorganic pigment particles; and c) a water-soluble dispersant absorbed onto the surfaces of the opacifying inorganic pigment particles;

wherein the weight-to-weight ratio of the polymeric binder to the sum of the shell and the structural units of monomers in the core in the multistage polymer particles is in the range of 1:1 to 3.5:1; and the z-average particle size of the multistage polymer particles is in the range of from 400 nm to 600 nm;

wherein the water-soluble dispersant comprises from 50 to 80 weight percent structural units of a sulfonic acid monomer or a salt thereof and less than 30 weight percent structural units of acrylic acid or methacrylic acid, based on the weight of the water-soluble dispersant, wherein the sulfonic acid monomer is 2-acrylamido-2-methylpropane sulfonic acid or a salt thereof, vinyl sulfonic acid or a salt thereof, 2-sulfoethyl acrylate, 2-sulfoethyl methacrylate, 3-sulfopropyl acrylate, 3-sulfopropyl methacrylate, sodium styrene sulfonate, or 2-propene-1-sulfonic acid or a salt thereof; and the water-soluble dispersant has an $M_w$ of from 1000 to 8000 g/mol, wherein the concentration of the water-soluble dispersant is in the range of from 0.1 to 5 weight percent, based on the weight of the dispersant and the inorganic pigment particles.

2. The composition of claim 1 wherein the polymeric binder is an acrylic, a styrene-acrylic, a vinyl ester, or a vinyl ester-ethylene polymeric binder; wherein the weight-to-weight ratio of structural units core to shell monomers in the multistage polymer particles is in the range of 1:12 to 1:16; wherein the weight-to-weight ratio of the polymeric binder to the sum of the structural units of monomers of the core and the shell in the multistage polymer particles is in the range of from 1.5:1 to 2.5:1; and wherein the opacifying inorganic pigment particles are $TiO_2$ particles.

3. The composition of claim 2 wherein the polymeric shell of the multistage polymer particles has a $T_g$ in the range of from 90°° C. to 110° C., and the shell further comprises structural units of at least one monomer selected from the group consisting of methyl methacrylate, α-methylstyrene, isobornyl methacrylate, lauryl methacrylate, and cyclohexyl methacrylate, and structural units of a multiethylenically unsaturated monomer.

4. The composition of claim 3 wherein the polymeric binder is an acrylic binder or a styrene-acrylic binder.

5. The composition of claim 1 wherein the sulfonic acid monomer is 2-acrylamido-2-methylpropane sulfonic acid or a salt thereof; wherein the water-soluble dispersant further comprises structural units of hydroxyethyl methacrylate or hydroxypropyl acrylate, and from 0.5 to 5 weight percent structural units of a carboxylic acid monomer, based on the weight of the water-soluble dispersant.

6. The composition of claim 5 wherein the polymeric shell of the multistage polymer particles comprises from 89 to 93 weight percent structural units of styrene and from 7 to 11 weight percent structural units of at least one monomer selected from the group consisting of methyl methacrylate, cyclohexyl methacrylate, methacrylic acid, and allyl methacrylate.

7. The composition of claim 1 wherein the composition further comprises at least one additional material selected from the group consisting of coalescents, rheology modifiers, surfactants, defoamers, and extenders.

* * * * *